Figure 1:
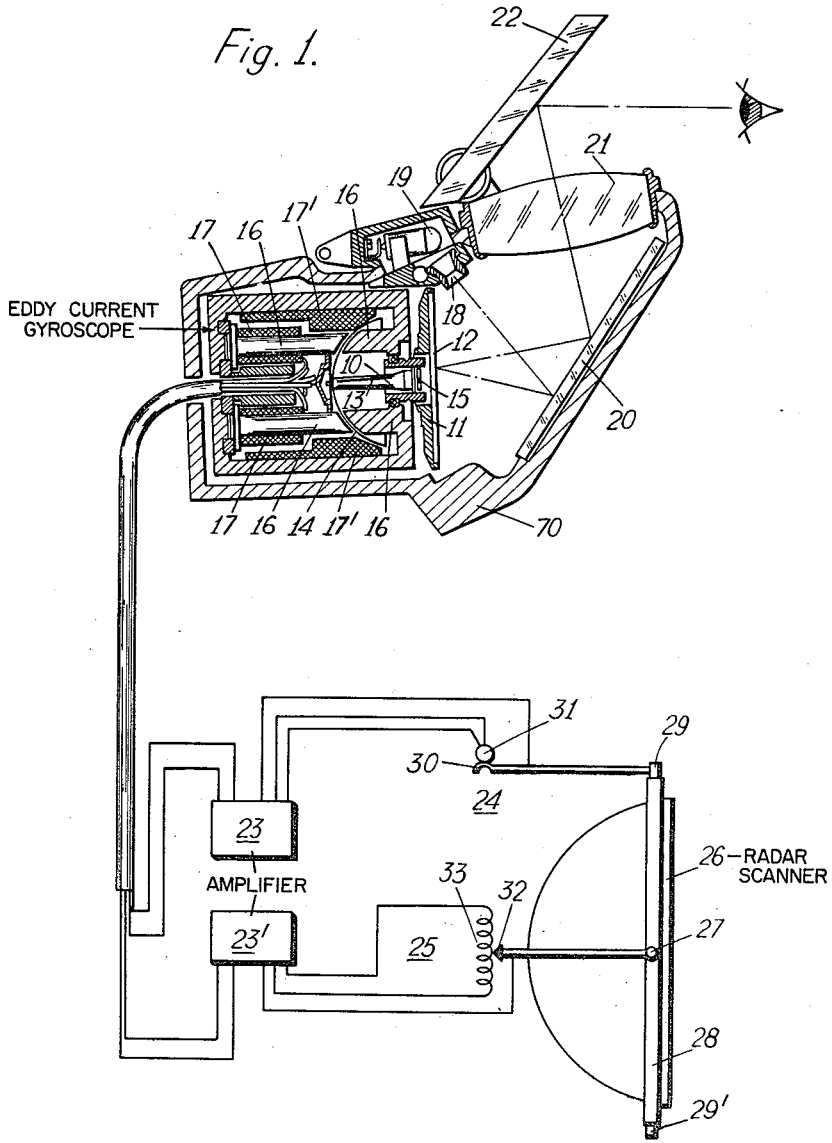

Jan. 23, 1962 M. POWLEY ETAL 3,018,476
APPARATUS FOR DISPLAYING TO A GUNNER OR PILOT IN AN AIRCRAFT
AN ARTIFICIAL IMAGE AT INFINITY OF A GRATICULE
Filed Sept. 21, 1956 3 Sheets-Sheet 1

Inventors
Mallinson Powley
Ben Sykes
By
Cameron, Kerkam & Sutton
Attorneys

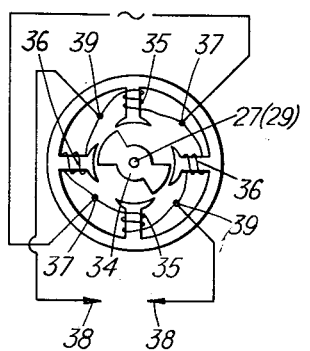
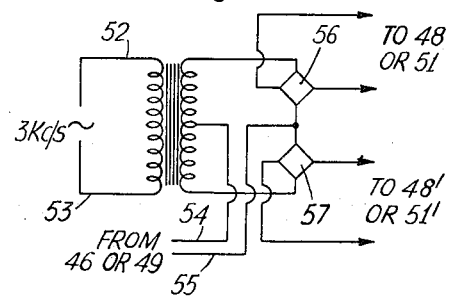
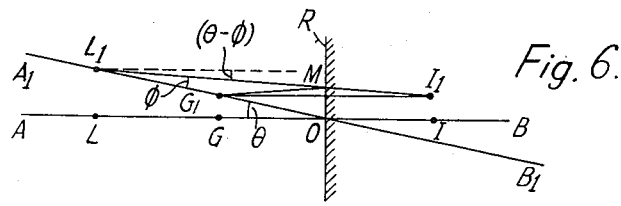
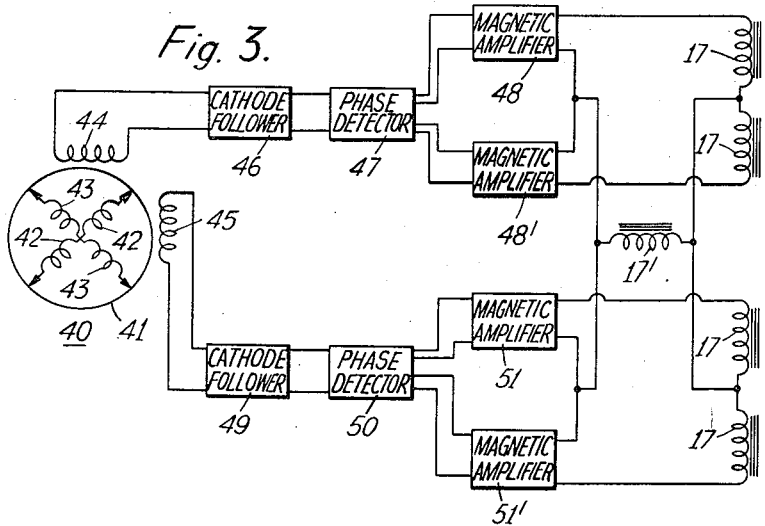

United States Patent Office
3,018,476
Patented Jan. 23, 1962

3,018,476
APPARATUS FOR DISPLAYING TO A GUNNER OR PILOT IN AN AIRCRAFT AN ARTIFICIAL IMAGE AT INFINITY OF A GRATICULE
Mallinson Powley, Edinburgh, Scotland, and Ben Sykes, Farnborough, Hampshire, England, assignors to Ferranti, Limited, Hollinwood, Lancashire, England, a company of Great Britain and Northern Ireland
Filed Sept. 21, 1956, Ser. No. 611,388
4 Claims. (Cl. 343—7)

This invention relates to apparatus for displaying to an observer in an aircraft, such as the pilot, an image at infinity of a graticule or the like, lying in the direction of an object ahead of the aircraft. The invention has an application in gun aiming systems of the predictor-controlled kind described in U.S. Patent No. 2,527,245, dated October 25, 1950, in which it is necessary for the pilot to maintain an optical sight in coincidence with the target to ensure that the gun is maintained at the correct deflection angle as calculated by the predictor. In such an application, the graticule image above referred to forms an artificial target to take the place of the actual target when conditions of poor visibility due to darkness or weather prevent the pilot from seeing the actual target with sufficient clarity. Under such conditions the pilot keeps the optical sight of the gun aiming system in coincidence with the artificial target formed by the graticule image of the present invention. The invention also has an application in the navigation of an aircraft, where the image serves to indicate the direction in which the aircraft is to be flown.

It is known to use radar to obtain signals which indicate the presence of an object ahead of an aircraft by the display at infinity of an image of a graticule or the like. Devices using this principle suffer from a defect inherent in radar systems, namely, that the direction of the radar-controlled image does not continuously coincide with the true direction of the object, but differs therefrom by a small and randomly-varying angle.

It is essential, if the principle is to be utilised effectively, that the direction of the image should at all times coincide, or nearly coincide, with that of the object. It is therefore necessary to associate smoothing means with the radar in order to remove the random variation referred to. It is also desirable to ensure that disturbances arising from movements of the airframe upon which the apparatus is mounted do not affect the direction of the image as seen by the pilot.

The main object of the invention is to provide a means of displaying in an aircraft an image at infinity of a graticule or the like the direction of which is maintained coincident, or nearly coincident to a predetermined extent, with that of an object ahead of the aircraft.

According to the invention apparatus for displaying in an aircraft an image at infinity of a graticule or the like, lying in the direction of an object ahead of the aircraft, comprises collimating optical means, including a mirror, for displaying said image, means for tilting the said mirror relative to a datum direction in dependence upon deviation of the axis of a gyroscope rotor from the said or another datum direction and means for applying such rates of precession to said gyroscope rotor in response to signals indicative of the direction of said object and derived from radar means as to maintain coincidence, or near coincidence, between the direction of said image and that of said object.

Referring to the accompanying drawings:

FIGURE 1 shows a part sectional, part diagrammatic view of apparatus according to one embodiment of the invention.

Figure 5:
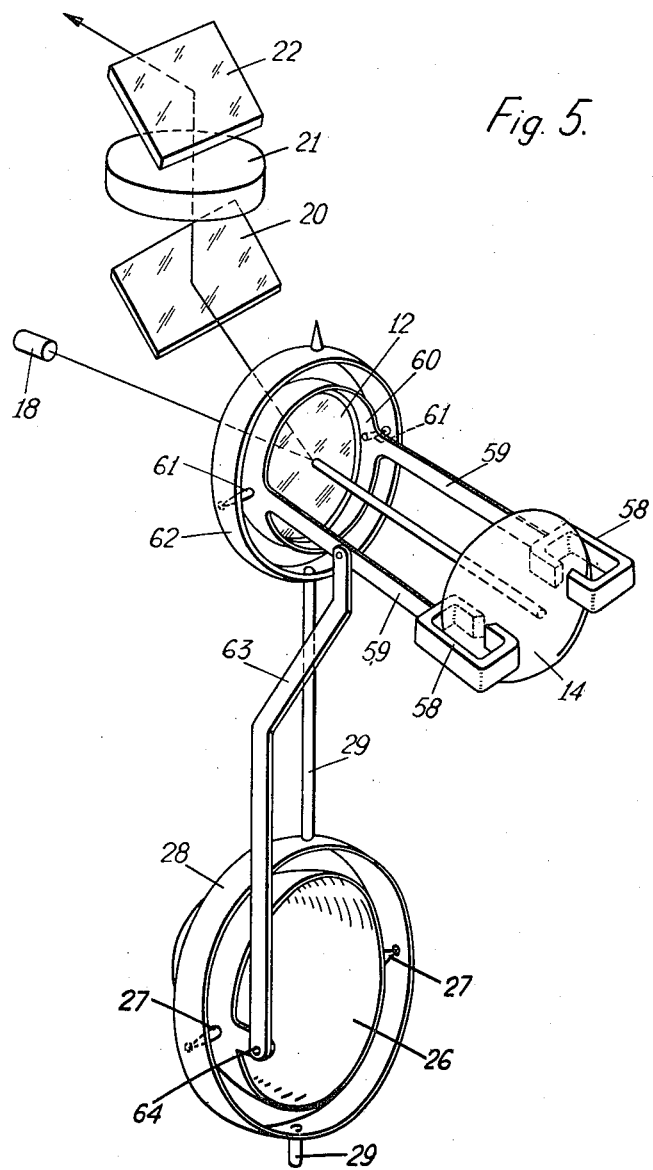

FIGURE 2 shows diagrammatically a form of sine-cosine resolver suitable for use with the apparatus of FIGURE 1, FIGURE 3 shows a circuit diagram of part of the apparatus of FIGURE 1, FIGURE 4 shows a circuit diagram of a phase detector suitable for the circuit of FIGURE 3, FIGURE 5 shows diagrammatically apparatus according to another embodiment of the invention, and FIGURE 6 is a diagram for explanatory purposes of a simplified optical system.

The invention may be carried into effect according to one form by way of example by means which include apparatus similar to that shown in FIGURES 2 to 5 of the above mentioned U.S. Patent No. 2,527,245. The basic features of such apparatus, modified in some respects, are shown diagrammatically in FIGURE 1 of the accompanying drawings. As shown, a gyroscope rotor 10 comprises a wheel 11 having a mirror 12 on its front face, a spindle 13 carrying the wheel 11 and an aluminium dome 14. The rotor is belt-driven by a motor (not shown), the drive being conveyed to the rotor through a Hooke's joint 15. The dome 14 passes through gaps between pairs of magnetic pole pieces 16 associated with coils 17 and $17^1$ adapted to carry control currents. The mirror 12 forms part of a collimating optical system which includes a graticule 18 and illuminating source 19, mirror 20, lens 21 and transmitting reflector 22 for forming an image of the graticule 18 at infinity. This optical system is designed, for the reason given hereinafter, in such manner that the path length from graticule 18 to mirror 12 is equal to the path length from mirror 12 to lens 21. By utilising mirror 20 twice for reflection purposes, a compact arrangement is permitted.

The apparatus is contained in a housing 70 attached rigidly to the frame of an aircraft with the spin-axis of rotor 10 disposed fore-and-aft and with transmitting reflector 22 disposed in the pilot's line of sight. Angular deflections of the gyroscope rotor 10 from its normal position of symmetry in relation to the magnet system 16 cause the direction in which the pilot sees the image of the graticule to change.

Fuller details of apparatus similar to that described above with reference to FIGURE 1 are given in the said Patent No. 2,527,245, where the apparatus forms a predictor gunsight. In such an apparatus, the direction of the optical sight of the system, which may also be in the form of a graticule image, is determined by feeding to the coils of the magnet system currents dependent on ballistic and other factors. Gun aiming is effected by bringing the image into linear coincidence with the target.

In applying the above-described apparatus to the present invention, for example for forming an artificial target for gun-aiming purposes, the coils 17 are fed with currents derived through amplifiers 23, $23^1$ from pick-offs 24, 25 associated with the scanner 26 of a radar system. The scanner is mounted for horizontal rotation about axles 27 in a gimbal frame 28 carried on vertical axles 29, $29^1$. Axle 29 carries a contact 30 of pick-off 24, which co-operates with a winding 31 to provide an input to amplifier 23 which is dependent on the position of the scanner 26 in azimuth. A contact 32 of pick-off 25 is carried by an axle 27 and co-operates with a winding 33 to provide an input to amplifier $23^1$ in dependence on the position of scanner 26 in elevation. The energised coils and magnet systems cause appropriate precession of the gyroscope rotor 10 to effect displacement of the image of the graticule 18 to maintain it coincident, or near-coincident to a predetermined extent, in direction with that of the real target scanned by the radar system.

In the above-described embodiment, the scanner 26 is coupled to the gyroscope rotor 10 in such a way that movement of the scanner in azimuth affects only the elevation-coil current. This gives correct results if the gimbal frame of the radar scanner is attached to and rolls with the airframe, since the artificial target-forming apparatus is also mounted rigidly on the airframe. However, it is normal practice to stabilise radar scanners by means of a gyro vertical, and movements of the scanner in azimuth and elevation are in fact horizontal and vertical movements in space respectively. Consequently as the aircraft rolls, the reference frame of the apparatus rotates about the roll axis relative to the reference frame of the scanner.

In these circumstances a sine-cosine resolver is necessary in the link from the scanner to the gyroscope rotor 10 to transform the scanner information from rectangular co-ordinate axes in space to airframe co-ordinates axes. There already exist many well-kown sine-cosine resolvers which are suitable for the purpose.

One practical form of sine-cosine resolver, described by way of example, is of the A.C. operated variometer type. For use with such a resolver the pick-offs 24 and 25 of FIGURE 1 are replaced by inductive bridge pick-offs, each as shown in FIGURE 2. In this device the rotor 34 is mounted on one of the axles 27 or one of the axles 29, as the case may be, so as to rotate with it. The stator coils 35, 35 and 36, 36 are oppositely wound and are connected together to form a bridge with a 3 kc./s. supply connected to points 37, 37 and with connections 38, 38 joined to points 39, 39.

Referring now to FIGURE 3, the variometer type sine-cosine resolver 40 comprises a rotor 41 having crossed pairs of coils 42, 42 and 43, 43. One pair of coils 42, 42 are joined to the connections 38, 38 (see FIGURE 2) of one pick-off, say, that for giving azimuth information, whilst the other pair of coils 43, 43 are joined to the connections 38, 38 of the other pick-off. The rotor 41 is mounted to rotate about the roll axis of the gimbal frame 28 (see FIGURE 1). The stator windings 44, 45 are carried on a base (not shown) secured to the airframe, and they respectively provide the output voltages representing the azimuth and elevation of the target transformed from space to airframe co-ordinates.

Winding 44 is connected to a cathode follower 46 which transmits the 3 kc./s. signal at low impedance to a phase detector 47 of the bridge type described below. This form of phase detector yields D.C. output currents which are equal when the signal current is zero and which vary in opposite senses to each other when the signal current varies. The output currents are applied in push-pull as the control currents for two magnetic amplifiers 48, 48$^1$, the output currents of which are also D.C. and are fed into the appropriate coils 17 of the artificial target-forming apparatus (see FIGURE 1) to give a push-pull variation of magnetic flux about some mean value without reversing the flux at any time, depending on the azimuthal movements of the scanner 26.

The circuit connecting the stator coil 45 to the appropriate coils 17 to give a variation of magnetic flux dependent on the elevational movements of scanner 26 is similar to that described for coil 44, and comprises the cathode follower 49, phase detector 50, and magnetic amplifiers 51, 51$^1$.

The return path for the currents from all four magnetic amplifiers, which are all in the same direction, includes a coil 17$^1$ of the artificial target-forming apparatus, which thus provides a steady polarising flux.

It may be shown that the gyroscope rotor 10 tends towards a position in which its deflection in azimuth or elevation is proportional to the difference in ampere-turns between the azimuth or elevation coils 17, as the case may be, divided by the ampere-turns of coil 17$^1$.

The tightness of the coupling between scanner 26 and gyroscope rotor 10—and therefore the degree of smoothing afforded by the system—depends only on the ampere-turns of coil 17$^1$. To reduce the coupling and increase the degree of smoothing the value of the current through coil 17$^1$ must be reduced. The magnetic amplifiers may be designed to this without altering the proportionality referred to in the preceding paragraph.

The phase detector 47 or 50 may be of the bridge type shown in FIGURE 4. Leads 52 and 53 are connected to the 3 kc./s. supply to provide a reference phase, whilst leads 54 and 55 provide the input from the appropriate cathode follower 46 or 49, as the case may be. D.C. output from bridge 56 feeds the appropriate magnetic amplifier 48 or 51 and D.C. output from bridge 57 feeds the appropriate magnetic amplifier 48$^1$ or 51$^1$.

In an alternative construction, see FIGURE 5, a permanent magnet system 58, 58 is provided in association with the dome 14. Arms 59, 59 connect the magnets 58, 58 to a ring 60 mounted on horizontal pivot 61, 61 in a gimbal frame 62. Frame 62 is mounted on a vertical axle 29 carrying gimbal frame 28. A cranked arm 63 connects one arm 59 by way of pivot 64 to scanner 26 near one of the horizontal axles 27. Movement of the scanner in azimuth and elevation causes corresponding movement of the magnets 58, 58 thus bringing about a change in the eddy-current drag applied to the dome and appropriate precession of the gyroscope rotor.

The optical part of the apparatus, indicated at 18, 12, 20, 21 and 22, is the same as that described with reference to FIGURE 1.

Magnets 58, 58 may be replaced by a single, centrally-disposed magnet.

In the foregoing description of the optical system shown in FIGURE 1 it was stated that the path length from graticule 18 to mirror 12 is equal to the path length from mirror 12 to lens 21. The reason for this is to ensure that disturbances arising from airframe movements do not affect the direction of the image of graticule 18 as seen by the observer. That such equality of path lengths has this result may be demonstrated by a consideration of the simplified optical system diagrammatically shown in FIGURE 6.

In this diagram, the line AB represents the initial direction of an airframe reference line, the spin-axis of a gyroscope on which mirror R is mounted being coincident with it. A ray from a graticule at G on line AB is reflected normally at O by mirror R and reaches the nearer nodal point of a lens at L, also on line AB, as if it had come from the image at I of the graticule at G.

If now the airframe suffers disturbance so that the airframe reference line is turned through an angle $\theta$ to lie in the direction $A_1B_1$, the gyroscope axis maintains its initial direction in space and the graticule, lens and image take up the new positions $G_1$, $L_1$, and $I_1$ respectively. The path of a ray from the new position $G_1$ of the graticule to the new position $L_1$ of the lens is $G_1ML_1$, the line $L_1M$ being the new apparent direction of the graticule axis. The graticule axis thus makes an angle $\phi$ with the new direction $A_1B_1$ of the airframe reference line, whilst the gyroscope axis makes an angle $\theta$ with line $A_1B_1$. Consequently, if the gyroscope axis remains directed at the target, the graticule axis moves off target by an angle $(\theta-\phi)$. Hence to prevent the graticule axis moving off target, angle $\phi$ must be equal to angle $\theta$.

The ratio: gyro-axis deflection/graticule-axis deflection is known as the K-ratio, and is expressed by $\theta/\phi$, and is unity when angle $\phi$ equals angle $\theta$.

It will be seen from FIGURE 6 that for small angles of deflection.

$$\frac{\theta}{\phi} = \frac{LI}{GI}$$

Consequently, if $\phi$ is to be equal to $\theta$, LI and GI must be equal, that is, LO must equal OG. In other words, when the path length from the graticule to the mirror is equal to that from the mirror to the lens, the graticule axis remains on target notwithstanding disturbance to the airframe.

The artificial target formed by the apparatus of FIGURE 1 or of FIGURE 5 may be tracked by a gun aiming system of the kind referred to above, by keeping the image of the graticule of the gun aiming system in coincidence with the image of the graticule 18 of the apparatus of the present invention. The artificial target may also be tracked by a predictor gunsight of any other construction.

Since the real target is not obscured by the transmitting reflector 22 of the apparatus according to the invention, normal use of a gunsight or predictor gun aiming system in conditions of satisfactory visibility is not prevented because the optical sight may then be maintained in coincidence with the target itself in the usual manner.

For aircraft navigation purposes some object which determines the desired course of the aircraft, such as a landmark, a beacon or another aircraft, is scanned by the radar system instead of a target, with the result that the graticule image then indicates the direction of that object and so assists the pilot in navigating with respect thereto.

What we claim is:

1. Apparatus for displaying in an aircraft an artificial image at infinity of a graticule comprising a graticule and collimating optical means, including a mirror and a lens so positioned that the length of the path of a light ray between said graticule and said mirror is equal to the length of the path between said mirror and said lens, for forming an artificial image at infinity of said graticule, the direction of said image being dependent upon the position of said mirror relative to a datum direction, a gyroscope rotor having its axis normally coincident with the direction of a reference line fixed in relation to the airframe of the aircraft, means for mounting said mirror in a fixed position relative to said gyroscope rotor whereby said mirror is tilted relative to said datum direction and thereby changes the direction of said image in dependence upon deviation of the axis of said gyroscope rotor from said reference line, radar means including a scanner for producing signals indicative of the direction of an object ahead of the aircraft, and means responsive to said signals for applying such rates of precession to said gyroscope rotor as to maintain at least near coincidence between the direction of said image and that of said object.

2. Apparatus as claimed in claim 1 in which said means for applying rates of precession to said gyroscope rotor comprise a plurality of electromagnets and a conductive dome forming a part thereof of said rotor disposed in the fields of said electromagnets, the windings of said electromagnets being connected for energisation in dependence on deflections of the scanner of said radar, whereby eddy-current drag is applied by said dome to said rotor to effect appropriate precession thereof.

3. Apparatus as claimed in claim 1 in which the said datum direction of said mirror is fixed in relation to the axes of the airframe of the aircraft and deflections of the scanner of said radar are determined with reference to rectangular co-ordinate axes in space, and which includes sine-cosine resolver means between said scanner and said gyroscope rotor.

4. Apparatus as claimed in claim 1 in which said means for applying rates of precession to said gyroscope rotor comprise at least one permanent magnet and a conductive dome forming a part of said rotor disposed in the field of said magnet, and which includes linkage means connecting said magnet to the scanner of said radar in such manner as to cause the magnet to move in directions corresponding to the deflections of said scanner, whereby eddy-current drag is applied by said dome to said rotor to effect appropriate precession thereof.

References Cited in the file of this patent

UNITED STATES PATENTS

| | | |
|---|---|---|
| 2,419,239 | White | Apr. 27, 1947 |
| 2,467,972 | French | Apr. 19, 1949 |
| 2,527,245 | Cunningham | Oct. 24, 1950 |
| 2,543,002 | Deloraine | Feb. 27, 1951 |
| 2,703,039 | White | Mar. 1, 1955 |
| 2,715,776 | Knowles | Aug. 23, 1955 |
| 2,887,927 | Newton | May 26, 1959 |